United States Patent [19]
Alcock et al.

[11] Patent Number: 5,901,162
[45] Date of Patent: May 4, 1999

[54] HYBRID, SATURABLE REFLECTOR FOR MODE-LOCKING LASERS

[75] Inventors: Alfred John Alcock; Brian T. Sullivan, both of Gloucester, Canada

[73] Assignee: National Research Council of Canada, Ottawa, Canada

[21] Appl. No.: 08/838,526

[22] Filed: Apr. 8, 1997

Related U.S. Application Data

[60] Provisional application No. 60/015,424, Apr. 15, 1996.
[51] Int. Cl.[6] ..................................................... H01S 00/00
[52] U.S. Cl. ................................. 372/18; 372/45; 372/99
[58] Field of Search ................................ 372/99, 18, 45, 372/96

[56] References Cited

U.S. PATENT DOCUMENTS

| | | | |
|---|---|---|---|
| 5,237,577 | 8/1993 | Keller et al. | 372/18 |
| 5,241,413 | 8/1993 | Uenishi et al. | 372/22 |
| 5,265,107 | 11/1993 | Delfyett, Jr. | 372/18 |
| 5,434,873 | 7/1995 | Delfyett, Jr. | 372/18 |
| 5,627,854 | 5/1997 | Knox | 372/18 |
| 5,666,373 | 9/1997 | Sharp et al. | 372/18 |

*Primary Examiner*—Leon Scott, Jr.
*Attorney, Agent, or Firm*—Marks & Clerk

[57] ABSTRACT

A mode-locking device for a laser operating at a defined wavelength, has a substrate, transparent to the defined wavelength, with a front side for receiving, incident radiation and a back side. An anti-reflection coating is formed on the front side to minimize reflection loss at the defined wavelength. A quantum well structure is arranged on the back side. A high reflectance structure is arranged behind the quantum well structure in such a way that an electric field peak in the incident radiation lies coincides with that of the quantum well structure. This device offers a more reliable and less costly approach for the production of non-linear mirrors since the layers of the dielectric stack do not have to be formed by epitaxial deposition.

20 Claims, 5 Drawing Sheets

HYBRID, SATURABLE REFLECTOR FOR MODE-LOCKING LASERS

This application claims priority from U.S. provisional application Ser. No. 60/015,424 filed on Apr. 15, 1996 under 35 U.S.C.§119 (e).

FIELD OF THE INVENTION

This invention relates generally to lasers, and in particular to a mode-locking device for low gain lasers.

BACKGROUND OF THE INVENTION

For approximately ten years a number of researchers have been investigating the use of quantum well (QW) or multiple quantum well structures (MQWSs) as saturable absorbers for mode-locking low gain lasers. The interest in this approach lies in the potential for engineering the characteristics of such an absorber and optimizing it for a particular laser wavelength. Both intracavity elements and nonlinear reflectors have been studied.

More recently a saturable Bragg reflector incorporating a single quantum well to provide a small amount (e.g. 1–2%) of saturable loss has been proposed. Tsuda et al. Opt. Lett. 20, 1406 (1995) describe such a device, based on AlAs/AlGaAs, which they have used successfully to mode-lock both Ti:Sapphire and Cr:LiSAF lasers operating near 850 nm. The Bragg reflector illustrated in their paper, was grown by molecular beam epitaxy (MBE) and consisted of 30 high/low index pairs with a single GaAs quantum well buried in one of the layers. The entire structure, which was grown epitaxially on a GaAs substrate, acted as a high reflectivity mirror having an intensity dependent reflectivity governed by the saturable absorption behaviour of the quantum well. An important feature of this scheme is the fact that the effective saturation intensity can be controlled by varying the location of the quantum well within the multi-layer reflector structure. The Quantum Well was located at an electric field maximum in the first layer of the Bragg reflector.

A drawback of this saturable reflector, however, is the fact that the high reflectance stack has to be deposited epitaxially in order to deposit the epitaxial Quantum Well structure. Hence great care has to be taken in the fabrication of such a mirror to ensure that non saturable losses, particularly scattering, are extremely small, especially as a large number of layers, typically around 60, have to be grown to achieve the desired reflectance (typically around 99%). The fabrication of low loss reflectors by molecular beam epitaxy (MBE) is thus very difficult. Furthermore, the MBE deposition rate is slow compared to other processes.

A hybrid reflector, incorporating both epitaxially deposited semiconductor layers and evaporated dielectric layers, has been developed by U. Keller, et al. Opt. Lett. 17, 505 (1992). It is not capable of operating as a saturable Bragg reflector.

An object of the invention is to alleviate this problem.

SUMMARY OF THE INVENTION

According to the present invention there is provided a mode-locking device for a laser operating at a defined wavelength, comprising a substrate, transparent to said defined wavelength, having a front side for receiving incident radiation and a back side; an anti-reflection coating on said front side to minimize reflection loss at said defined wavelength; a quantum well structure arranged on said back side; and a high reflectance structure arranged behind said quantum well structure in such a way that an electric field peak in said incident radiation substantially coincides with said quantum well structure.

Ideally the electric field peak should coincide with the quantum well structure, although some departure from coincidence can be tolerated. The greater the departure from coincidence, the less the difference in the reflectance between the saturated and unsaturated cases. The acceptable level is a matter of choice that can readily be determined by a person skilled in the art depending on the particular application.

The quantum well structure normally consists of three epitaxial layers a quantum well layer and two outer layers. With this arrangement the high reflectance structure can be formed of a stack of layers deposited by non-epitaxial means, such as evaporation, ion plating, sputtering etc., resulting in a simpler, more reliable structure.

The device in accordance with the invention can be operated as a saturable Bragg reflector wherein the high reflectance structure can be a stack deposited non-epitaxially while the quantum well structure is deposited epitaxially. The light must now be incident on the quantum well structure from the substrate side.

An important advantage of the invention is the possibility of greatly reducing the number of required epitaxially grown layers and achieving a high reflectivity by means of the non-epitaxially deposited layers.

The mode-locking device can be used as a mode-locker for low gain laser media such as Ti:Sapphire, Cr:LiSAF and CR:YAG.

The invention also provides a method of fabricating a mode-locking device for a laser operating at a defined wavelength, comprising the steps of providing a substrate, transparent to said defined wavelength, having a front side for receiving incident radiation and a back side; providing an anti-reflection coating on said front side to minimize reflection loss at said defined wavelength; providing a quantum well structure on said back side; and providing a high reflectance structure behind said quantum well structure in such a way that an electric field peak in said incident radiation substantially coincides with said quantum well structure.

BRIEF DESCRIPTION OF THE DRAWINGS

The invention will now be described in more detail, by way of example only, with reference to the accompanying drawings, in which.

DESCRIPTION OF THE PREFERRED EMBODIMENTS

Figure 1:
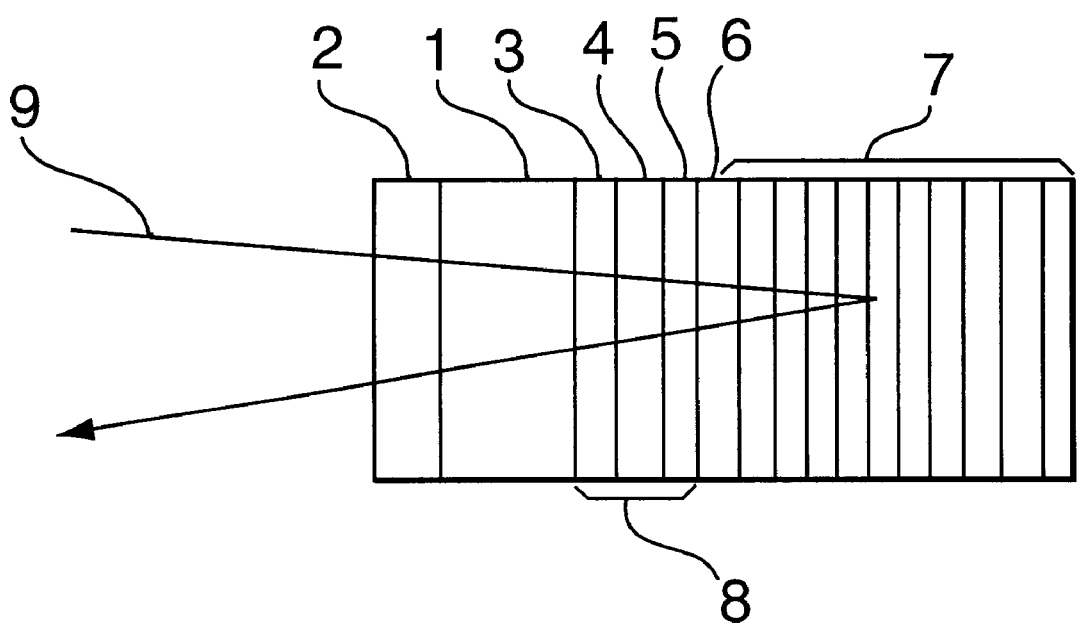
FIG. 1 is a schematic diagram of a mode locking device in accordance with the invention.

Referring now to FIG. 1, the mode-locking device comprises a 0.5 mm transparent InP substrate 1 having a refractive index n of 3.17. On the front side of the substrate 1 is deposited, for example, by ion plating techniques an anti-reflective layer 2 consisting of $Nb_2O_5$ with a refractive index n of 2.31 and $SiO_2$ with a refractive index n of 1.48.

On the back side of the transparent substrate is deposited by molecular beam epitaxy a quantum well structure 8 consisting of a first AlInAs layer 3 having an optical thickness of $\lambda/4$, where $\lambda$ is the wavelength of the radiation, for example, 1.5 μm, and a refractive index n of 3.2 1.

Next an 8 nm GaInAs quantum well layer 4 with a refractive index n of 3.51 is grown by molecular beam epitaxy on the first layer 3. Subsequently a second AlInAs layer 5 having an optical thickness of $\lambda/4$, and a refractive index n of 3.21 is grown epitaxially onto the quantum well layer 4. Finally an additional 2 nm GaInAs layer 6 is grown epitaxially onto the second outer layer 5. The layer 6 has a refractive index n of 3.51 and serves as a protective or capping layer for the AlInAs layer 5.

Finally a stack of dielectric $Nb_2O_5/SiO_2$ layers 7 is deposited by ion plating onto the outermost epitaxial layer 6. The $Nb_2O_5$ layers have a refractive index n of 2.31 and $SiO_2$ have a refractive index n of 1.48. The layers have an optical thickness of $\lambda_0/4$. The optical thickness is the physical thickness multiplied by the refractive index. Typically there are 10 or 11 layers of alternately high and low refractive index. The stack typically has a reflectance of around 98%.

The thickness and materials of the layers are chosen such that when the laser light is incident on the antireflective layer 2, the location of the electric field peaks, within the complete structure, substantially coincides with that of the quantum well.

The described mode-locking device provides a laser reflector that has a low intensity reflectivity, $R_L$ and a high intensity reflectivity $R_H$, such that $R_L$ is less than $R_H$ but is still sufficiently high to permit laser oscillation to build up in a suitably designed laser system.

Although it is possible to fabricate such reflectors at many different wavelengths the 1.5 μm region is particularly interesting since this is an important wavelength region for optical communications. Both erbium fiber and Cr4+-doped lasers operate in this region. In addition, InP can be used as the transparent substrate for an InAlAs/InGaAs quantum well structure.

Using the optical constants for these materials, a suitable structure, which places an electric field peak in the quantum well, has been designed and modeled numerically while tests carried out with an ion-plating facility have demonstrated that high quality $Nb_2O_5/SiO_2$ layers, capable of providing high reflectivity at 1.5 μm, can be deposited on top of the MBE-grown semiconductor layers.

In use the device provides a passive mode-locker for a low gain laser, such as Ti:Sapphire and Cr:LiSAF. Incident light 9 enters through the anti-reflective coating on the front side, passes through the quantum well structure and is reflected in the dielectric stack 7.

To show the importance of having an electric field maximum at the position of the QW, numerical modeling was used to examine two different cases.

Figure 2:
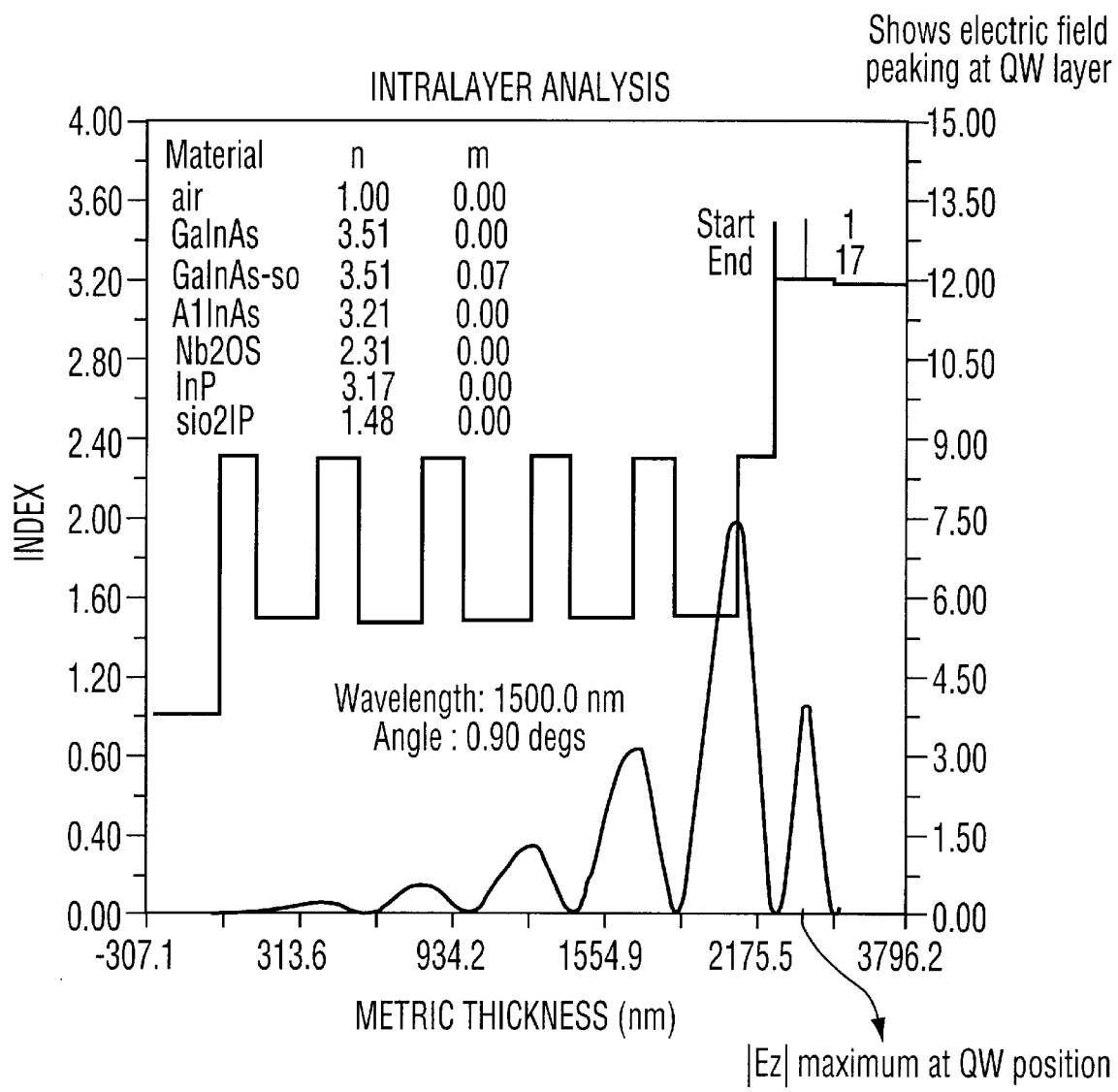
FIG. 2 is a plot of a simulation showing the electric field peaking at the quantum well layer.
Figure 3:
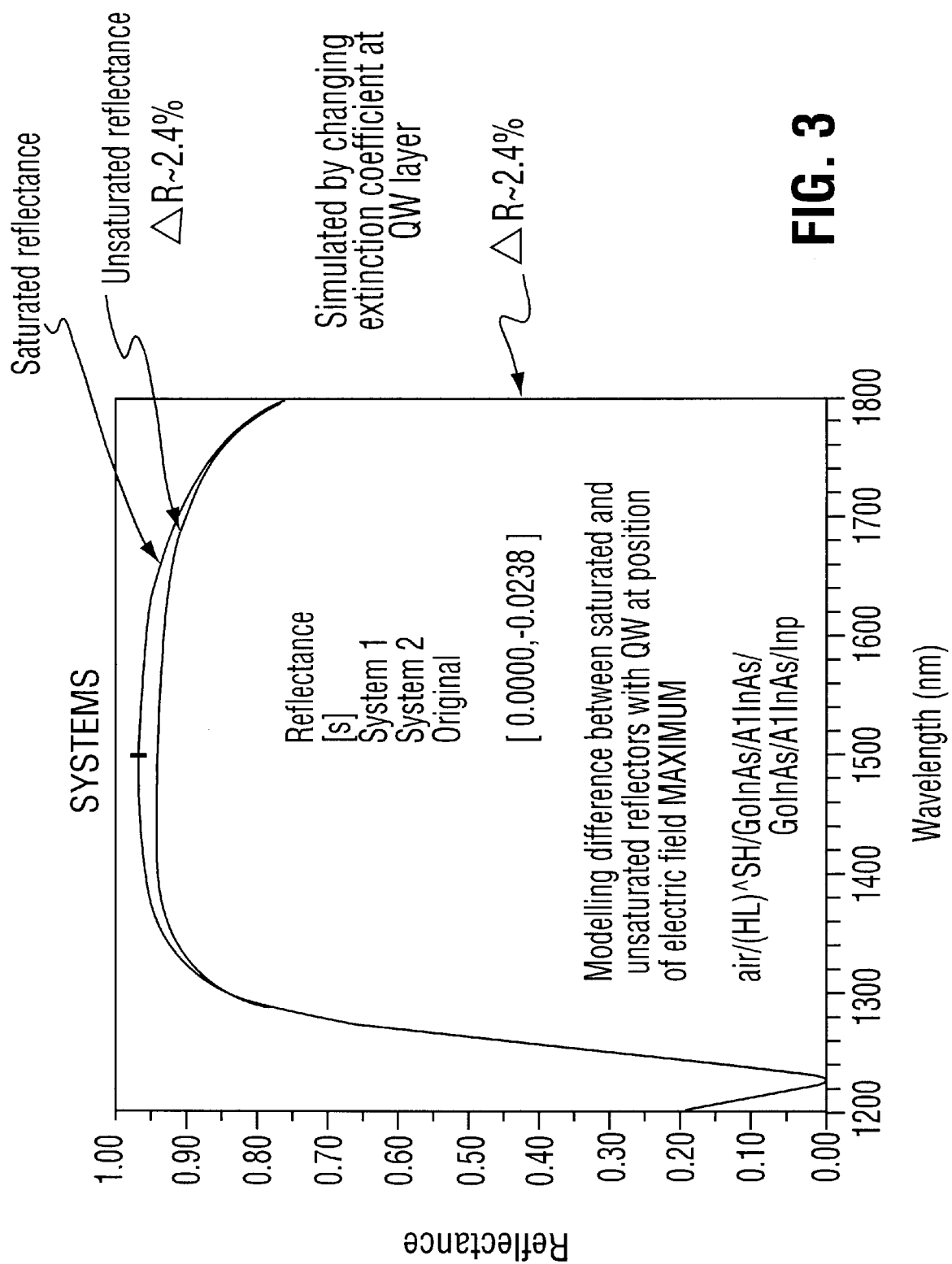
FIG. 3 is a plot showing the difference in reflectance for the saturated and unsaturated cases for FIG. 1.

First, a high reflector was designed such that the electric field peaked at the quantum well layer 4 (FIG. 2). Then to simulate the unsaturated case, an extinction coefficient was added to the Quantum well material, while for the saturated case the extinction coefficient was zero. The difference in reflectance for the saturated and unsaturated cases is shown in FIG. 3. This shows that a change in reflectance, AR, between the saturated and unsaturated case of approximately 2.4% would be observed.

Figure 4:
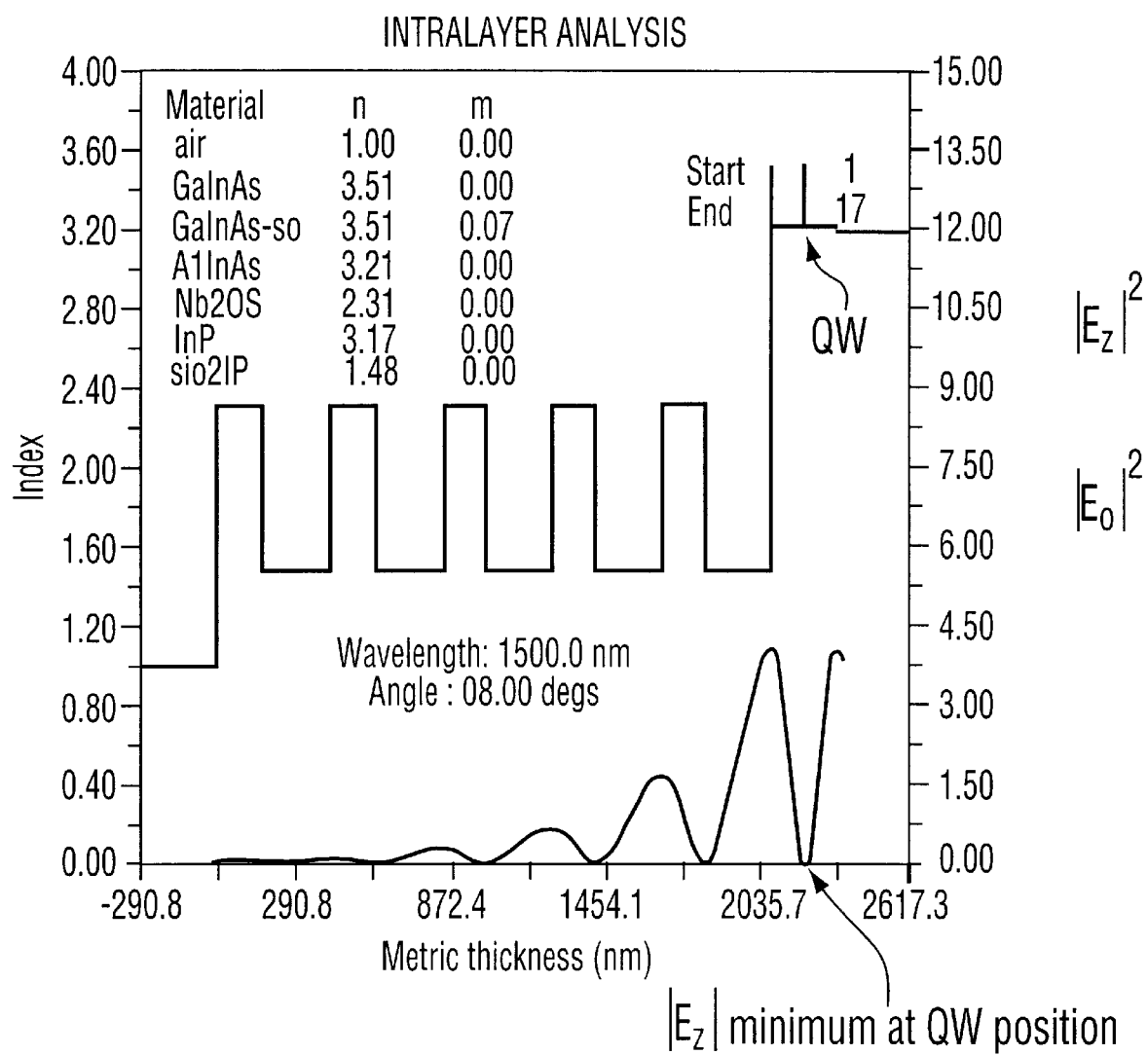
FIG. 4 is a plot of a simulation showing the electric field at a minimum at the quantum well layer.
Figure 5:
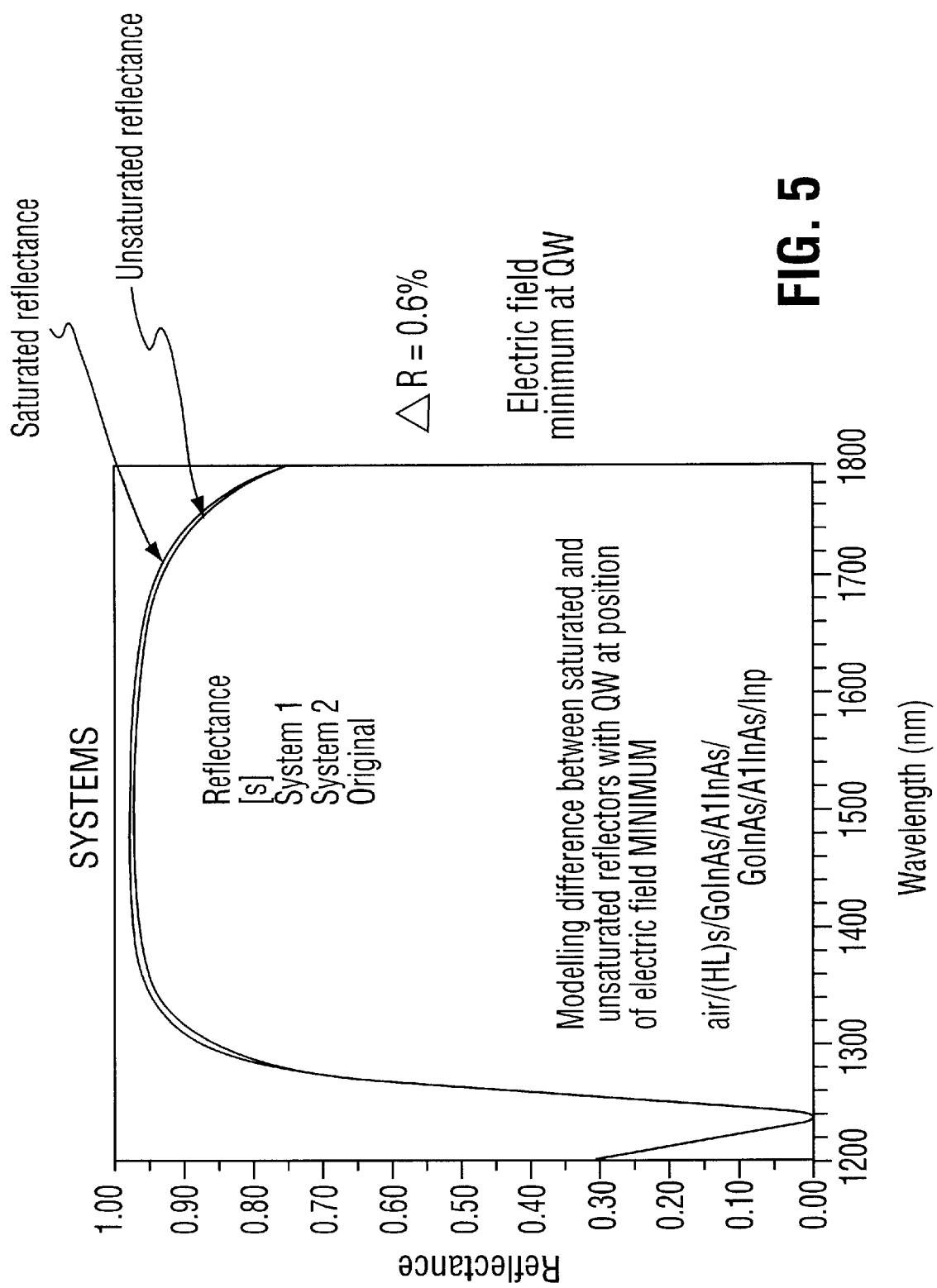
FIG. 5 is a plot showing the difference in reflectance for the saturated and unsaturated cases for FIG. 4.

Next, a high reflector was designed such that the electric field is a minimum at the Quantum well layer 4 (FIG. 4). The difference in reflectances for the saturated and unsaturated cases is shown in FIG. 5. Here it is apparent that there is no significant change in reflectance, and hence the device is less likely to be effective as a saturable reflector. This modeling shows that it is important to design the high reflectance structure properly in order for the hybrid saturable reflector to achieve the maximum change in reflectance.

The described structure provides a passive mode-locking device that can be fabricated with two or three MBE layers and a dielectric stack using significantly fewer layers than the prior art.

We claim:

1. A mode-locking device for a laser operating at a defined wavelength, comprising:

a) a substrate, transparent to said defined wavelength, having a front side for receiving incident radiation and a back side;

b) an anti-reflection coating on said front side to minimize reflection loss at said defined wavelength;

c) a quantum well structure arranged on said back side; and d) a high reflectance structure arranged behind said quantum well structure in such a way that an electric field peak in said incident radiation substantially coincides with said quantum well structure.

2. A mode-locking device as claimed in claim 1, wherein said quantum well structure is deposited epitaxially on said back side of said substrate.

3. A mode-locking device as claimed in claim 2, wherein said quantum well structure comprises a quantum well layer sandwiched between two outer layers the thickness and materials of said layers being selected such that said quantum well will absorb some light at said defined wavelength.

4. A mode-locking device as claimed in claim 3, wherein said high reflectance structure comprises a stack of layers, at least one of which is a non-epitaxial layer.

5. A mode-locking device as claimed in claim 4, wherein all of said layers forming said stack of layers are non-epitaxial layers.

6. A mode-locking device as claimed in claim 4, wherein said layers forming said stack of layers are $Nb_2O_5/SiO_2$ layers.

7. A mode-locking device as claimed in claim 3, wherein said substrate is made of indium phosphide (InP).

8. A mode-locking device as claimed in claim 3, wherein said quantum well structure comprises a GaInAs layer sandwiched between a pair of AlInAs layers.

9. A mode-locking device as claimed in claim 8, wherein said AlInAs layers have a thickness $\lambda/4$, where $\lambda$ is said predefined wavelength.

10. A mode-locking device as claimed in claim 8, wherein said wavelength is about 1.5 μm.

11. A method of fabricating a mode-locking device for a laser operating at a defined wavelength, comprising the steps of:

a) providing a substrate, transparent to said defined wavelength, having a front side for receiving incident radiation and a back side;

b) providing an anti-reflection coating on said front side to minimize reflection loss at said defined wavelength;

c) providing a quantum well structure on said back side; and d) providing a high reflectance structure behind said quantum well structure in such a way that an electric field peak in said incident radiation substantially coincides with said quantum well structure.

12. A method as claimed in claim 1, wherein said quantum well structure is deposited epitaxially on said back side of said substrate.

13. A method as claimed in claim 12, wherein said quantum well structure is formed by sequentially depositing epitaxially a first outer layer on the back side of said substrate, depositing epitaxially a quantum well layer on said first layer, and depositing epitaxially a second outer layer on said quantum well layer, the thickness and materials of said layers being selected such that said quantum well will absorb some light at said defined wavelength.

14. A method as claimed in claim 13, wherein said high reflectance structure is formed by depositing a stack of layers, at least one of which is deposited by non-epitaxially, on said second outer layer of said quantum well structure.

15. A method as claimed in claim 14, wherein all of said layers forming said stack of layers are formed non-epitaxially.

16. A method as claimed in claim 15, wherein said layers forming said stack of layers are formed by a method selected from the group consisting of evaporation, ion plating, and sputtering.

17. A method as claimed in claim 11, wherein said substrate is made of indium phosphide (InP).

18. A method as claimed in claim 13, wherein said quantum well structure comprises a GaInAs layer sandwiched between a pair of AlInAs layers.

19. A method as claimed in claim 18, wherein said AlInAs layers have a thickness $\lambda/4$, where $\lambda$ is said predefined wavelength.

20. A method as claimed in claim 11 wherein said wavelength is about 1.5 $\mu$m.

* * * * *